United States Patent
Takeuchi et al.

(10) Patent No.: US 10,711,724 B2
(45) Date of Patent: Jul. 14, 2020

(54) CONTROL APPARATUS FOR INTERNAL COMBUSTION ENGINE, AND CONTROL METHOD FOR INTERNAL COMBUSTION ENGINE

(71) Applicant: HONDA MOTOR CO., LTD., Tokyo (JP)

(72) Inventors: Masahiro Takeuchi, Wako (JP); Yosuke Naito, Wako (JP); Koichiro Shinozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 15/412,054

(22) Filed: Jan. 23, 2017

(65) Prior Publication Data

US 2017/0226952 A1  Aug. 10, 2017

(30) Foreign Application Priority Data

Feb. 4, 2016 (JP) .................................. 2016-019438

(51) Int. Cl.
*F02D 41/30* (2006.01)
*F02P 5/15* (2006.01)
(Continued)

(52) U.S. Cl.
CPC ......... *F02D 41/3005* (2013.01); *F02D 37/02* (2013.01); *F02D 41/009* (2013.01);
(Continued)

(58) Field of Classification Search
CPC combination set(s) only.
See application file for complete search history.

(56) References Cited

U.S. PATENT DOCUMENTS

| 5,519,617 A * | 5/1996 | Hughes .................. B60K 28/16 |
| | | 180/197 |
| 2004/0204289 A1 * | 10/2004 | Inoue .................... B60W 10/06 |
| | | 477/107 |

(Continued)

FOREIGN PATENT DOCUMENTS

| GB | 1103052 | 2/1968 |
| JP | 63-254256 | 10/1988 |
| JP | 2014-058907 | 4/2014 |

OTHER PUBLICATIONS

Chinese Office Action for corresponding CN Application No. 201710062975.0, dated Jul. 2, 2019.

*Primary Examiner* — Lindsay M Low
*Assistant Examiner* — Ruben Picon-Feliciano
(74) *Attorney, Agent, or Firm* — Mori & Ward, LLP

(57) ABSTRACT

A control apparatus for an internal combustion engine includes circuitry configured to control a fuel injector of the internal combustion engine to stop injecting fuel to reduce torque generated by the internal combustion engine during upshift. The circuitry is to acquire a target injection amount parameter corresponding to a target injection amount of the fuel to be injected by the fuel injector to operate the internal combustion engine based on an operation state parameter corresponding to an operation state of the internal combustion engine. The circuitry is to acquire a minimum injectable amount parameter corresponding to a minimum injectable amount of the fuel injectable from the fuel injector. The circuitry is to control the fuel injector to start injecting the fuel when the minimum injectable amount parameter exceeds the target injection amount parameter while the fuel injector is controlled to stop injecting the fuel during the upshift.

20 Claims, 6 Drawing Sheets

(51) Int. Cl.

|  |  |
|---|---|
| *F02D 41/12* | (2006.01) |
| *F02D 37/02* | (2006.01) |
| *F02D 41/40* | (2006.01) |
| *F02D 41/00* | (2006.01) |
| *F02D 41/02* | (2006.01) |
| *F02P 5/04* | (2006.01) |

(52) U.S. Cl.
CPC ......... *F02D 41/023* (2013.01); *F02D 41/126* (2013.01); *F02D 41/40* (2013.01); *F02P 5/045* (2013.01); *F02P 5/1504* (2013.01); *F02D 2200/0602* (2013.01); *F02D 2200/101* (2013.01); *F02D 2200/602* (2013.01); *Y02T 10/44* (2013.01); *Y02T 10/46* (2013.01)

(56) References Cited

U.S. PATENT DOCUMENTS

| 2005/0252491 | A1 |  | 11/2005 | Oono et al. |  |
|---|---|---|---|---|---|
| 2005/0261112 | A1 | * | 11/2005 | Kiuchi | ................. F02D 41/022 477/181 |
| 2010/0057310 | A1 | * | 3/2010 | Hopp | ................... F16H 61/143 701/54 |

* cited by examiner

CONTROL APPARATUS FOR INTERNAL COMBUSTION ENGINE, AND CONTROL METHOD FOR INTERNAL COMBUSTION ENGINE

CROSS-REFERENCES TO RELATED APPLICATIONS

The present application claims priority under 35 U.S.C. § 119 to Japanese Patent Application No. 2016-019438, filed Feb. 4, 2016, entitled "Control apparatus for internal combustion engine." The contents of this application are incorporated herein by reference in their entirety.

BACKGROUND

1. Field

The present disclosure relates to a control apparatus for an internal combustion engine and a control method for an internal combustion engine.

2. Description of the Related Art

A control apparatus described in Japanese Unexamined Patent Application Publication No. 2014-58907 has hitherto been known as a control apparatus for an internal combustion engine. This control apparatus is mounted in a vehicle as a power source and includes a fuel injection valve that injects fuel, an ignition plug that ignites air-fuel mixture, an automatic transmission, and so on.

In this control apparatus, as illustrated in FIG. 5 in Japanese Unexamined Patent Application Publication No. 2014-58907, torque-down control during shift transmission with the automatic transmission is performed. Specifically, while increase-in-weight control of fuel is being performed during the shift transmission, that is, during upshift transmission, it is determined whether an amount-of-variation $\alpha$ of a weight increase factor of an amount of fuel injection through delay angle control is higher than or equal to a predetermined amount-of-variation $\alpha$ref (Step 30). If $\alpha \geq \alpha$ref is established, the FC (Fuel Cut) torque-down control is performed (Step 40). The torque-down control is performed to reduce the torque generated in the internal combustion engine by stopping the fuel injection.

SUMMARY

According to one aspect of the present invention, a control apparatus for an internal combustion engine, in which fuel is injected with a fuel injection unit and a shift transmission operation is performed with an automatic transmission. The control apparatus includes a fuel-cut torque-down control unit that performs fuel-cut torque-down control to stop the fuel injection with the fuel injection unit so that torque generated by the internal combustion engine is reduced during upshift transmission with the automatic transmission; a requested injection amount parameter acquiring unit that acquires a requested injection amount parameter representing a requested injection amount, which is an amount of fuel injection from the fuel injection unit required in the internal combustion engine, on the basis of an operation state parameter representing an operation state of the internal combustion engine; a minimum injectable amount parameter acquiring unit that acquires a minimum injectable amount parameter representing a minimum injectable amount, which is a minimum value of the amount of fuel injection actually injectable from the fuel injection unit; and a fuel injection control unit that stops the fuel-cut torque-down control and performs the fuel injection with the fuel injection unit if the minimum injectable amount represented by the minimum injectable amount parameter exceeds the requested injection amount represented by the requested injection amount parameter while the FC torque-down control is being performed during the upshift transmission.

According to another aspect of the present invention, a control apparatus for an internal combustion engine includes circuitry. The circuitry is configured to control a fuel injector of the internal combustion engine to stop injecting fuel into the internal combustion engine to reduce torque generated by the internal combustion engine during upshift of an automatic transmission connected to the internal combustion engine. The circuitry is configured to acquire a target injection amount parameter corresponding to a target injection amount of the fuel to be injected by the fuel injector to operate the internal combustion engine based on an operation state parameter corresponding to an operation state of the internal combustion engine. The circuitry is configured to acquire a minimum injectable amount parameter corresponding to a minimum injectable amount of the fuel injectable from the fuel injector. The circuitry is configured to control the fuel injector to start injecting the fuel when the minimum injectable amount parameter exceeds the target injection amount parameter while the fuel injector is controlled to stop injecting the fuel during the upshift.

According to further aspect of the present invention, a control method for an internal combustion engine includes controlling a fuel injector of the internal combustion engine to stop injecting fuel into the internal combustion engine to reduce torque generated by the internal combustion engine during upshift of an automatic transmission connected to the internal combustion engine. A target injection amount parameter corresponding to a target injection amount of the fuel to be injected by the fuel injector to operate the internal combustion engine is acquired based on an operation state parameter corresponding to an operation state of the internal combustion engine. A minimum injectable amount parameter corresponding to a minimum injectable amount of the fuel injectable from the fuel injector is acquired. The fuel injector is controlled to start injecting the fuel when the minimum injectable amount parameter exceeds the target injection amount parameter while the fuel injector is controlled to stop injecting the fuel during the upshift.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
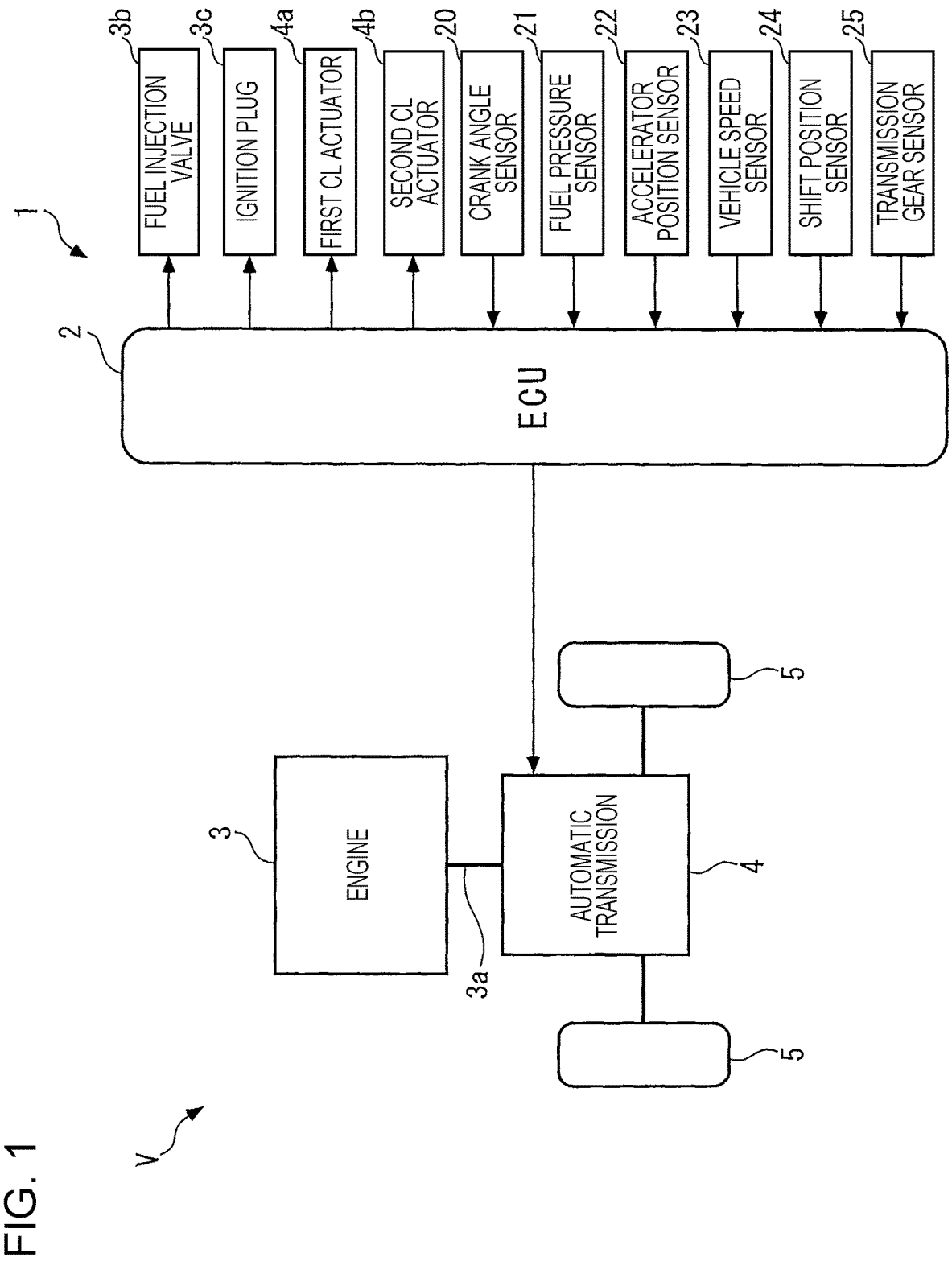
FIG. 1 schematically illustrates an exemplary configuration of a control apparatus according to an embodiment of the present disclosure and an internal combustion engine to which the control apparatus is applied.

The embodiment(s) will now be described with reference to the accompanying drawings, wherein like reference numerals designate corresponding or identical elements throughout the various drawings.

A control apparatus for an internal combustion engine according to an embodiment of the present disclosure will herein be described with reference to the attached drawings. FIG. 1 schematically illustrates an exemplary configuration of a control apparatus and an internal combustion engine to which the control apparatus is applied. Referring to FIG. 1, a control apparatus 1 of the present embodiment controls an internal combustion engine (hereinafter referred to as an "engine") 3, which is a power source of a vehicle V, and includes an engine control unit (ECU, circuitry) 2. Various control processes are performed by the ECU 2, as described below.

In the vehicle V, a crank shaft 3a of the engine 3 is mechanically coupled to left and right front wheels 5, which serve as drive wheels, via an automatic transmission 4 and so on. The automatic transmission 4 is of an automatic manual transmission (MT) type including multiple forward gears (for example, eight forward gears) and one reverse gear. The automatic transmission 4 includes, for example, first and second wet multi-disc clutches (not illustrated), first and second central locking (CL) actuators 4a and 4b for driving the respective clutches, and multiple transmission actuators (not illustrated) for driving a synchronization mechanism (not illustrated) for the respective transmission gears.

The first and second CL actuators 4a and 4b are electrically connected to the ECU 2 and switches the first and second clutches between an engagement state and a disengagement state under the control of a control input signal supplied from the ECU 2. The multiple transmission actuators are also electrically connected to the ECU 2 and drive the synchronization mechanism for the respective transmission gears under the control of the control input signal supplied from the ECU 2 to switch each transmission gear between an in-gear state and a neutral state. In other words, in the case of the automatic transmission 4, the first and second CL actuators 4a and 4b and the multiple transmission actuators are controlled to control the shift transmission operation of the automatic transmission 4.

With the above configuration, during running of the vehicle V, the power of the engine 3 is transmitted to the front wheels 5 while being subjected to the shift transmission with the automatic transmission 4. The vehicle V includes left and right rear wheels (not illustrated), which are idle wheels.

The engine 3 is a multi-cylinder internal combustion engine running on gasoline and includes, for example, a fuel injection valve 3b and an ignition plug 3c (only one fuel injection valve 3b and only one ignition plug 3c are illustrated in FIG. 1) provided for each cylinder. Fuel from a fuel tank is supplied to each fuel injection valve 3b via a fuel supply path with a fuel pump (the fuel tank, the fuel supply path, and the fuel pump are not illustrated in FIG. 1).

The fuel injection valve 3b, which serves as a fuel injection unit (a fuel injector), is electrically connected to the ECU 2. As described below, a fuel injection control process is performed by the ECU 2 to control the amount of fuel injection and the injection timing through the fuel injection valve 3b. The ignition plug 3c is also electrically connected to the ECU 2. As described below, an ignition timing control process is performed by the ECU 2 to control the ignition timing of air-fuel mixture with the ignition plug 3c.

A crank angle sensor 20, a fuel pressure sensor 21, an accelerator position sensor 22, a vehicle speed sensor 23, a shift position sensor 24, and a transmission gear sensor 25 are electrically connected to the ECU 2. The crank angle sensor 20 is composed of a magnet rotor and a magnetic resistance element (MRE) pickup. The crank angle sensor 20 supplies a CRK signal and a TDC signal, which are pulse signals, to the ECU 2 in response to rotation of the crank shaft 3a.

In the case of the CRK signal, one pulse is output every predetermined crank angle (for example, every two degrees). The ECU 2 calculates an engine rotation speed NE of the engine 3 on the basis of the CRK signal. The TDC signal indicates that the piston in each cylinder is at a position slightly on the near side of a TDC position of an intake air process at a predetermined crank angle with respect to the TDC position. In the case of the TDC signal, one pulse is output every predetermined crank angle. In the present embodiment, the crank angle sensor 20 corresponds to an engine rotation speed acquiring unit and the engine rotation speed NE corresponds to an operation state parameter.

The fuel pressure sensor 21 detects fuel pressure PF, which is actual pressure of fuel supplied to the fuel injection valve 3b, and supplies a detection signal indicating the fuel pressure PF to the ECU 2. In the present embodiment, the fuel pressure sensor 21 corresponds to a minimum injectable amount parameter acquiring unit and the fuel pressure PF corresponds to a minimum injectable amount parameter.

The accelerator position sensor 22 detects a degree of depression (hereinafter referred to as an "accelerator position") AP of an accelerator pedal (not illustrated) of the vehicle V and supplies a detection signal indicating the accelerator position AP to the ECU 2. The vehicle speed sensor 23 is mounted to an axle of the vehicle V. The vehicle speed sensor 23 detects a running speed (hereinafter referred to as a "vehicle speed") VP and supplies a detection signal indicating the vehicle speed VP to the ECU 2. In the present embodiment, the accelerator position sensor 22 corresponds to an amount-of-accelerator-operation acquiring unit and the accelerator position AP corresponds to an amount of accelerator operation.

The shift position sensor 24 supplies to the ECU 2 a shift position signal indicating a shift position, which is the position of a shift lever (not illustrated) of the automatic transmission 4. The transmission gear sensor 25 detects whether each transmission gear of the automatic transmission 4 is in the in-gear state and supplies a detection signal indicating the result of the detection to the ECU 2.

The ECU 2 is composed of a microcomputer including, for example, a central processing unit (CPU), a random access memory (RAM), a read only memory (ROM), and an input-output (I/O) interface, which are not illustrated in FIG. 1. The ECU 2 performs various control processes including a shift transmission control process and the fuel injection control process in manners described below in response to the detection signals supplied from the various sensors 20 to 25 described above.

In the present embodiment, the ECU 2 corresponds to an FC torque-down control unit, a requested injection amount parameter acquiring unit, the minimum injectable amount parameter acquiring unit, a fuel injection control unit, a target air amount calculating unit, the engine rotation speed acquiring unit, the amount-of-accelerator-operation acquiring unit, and a delay-angle torque-down control unit.

Figure 2:
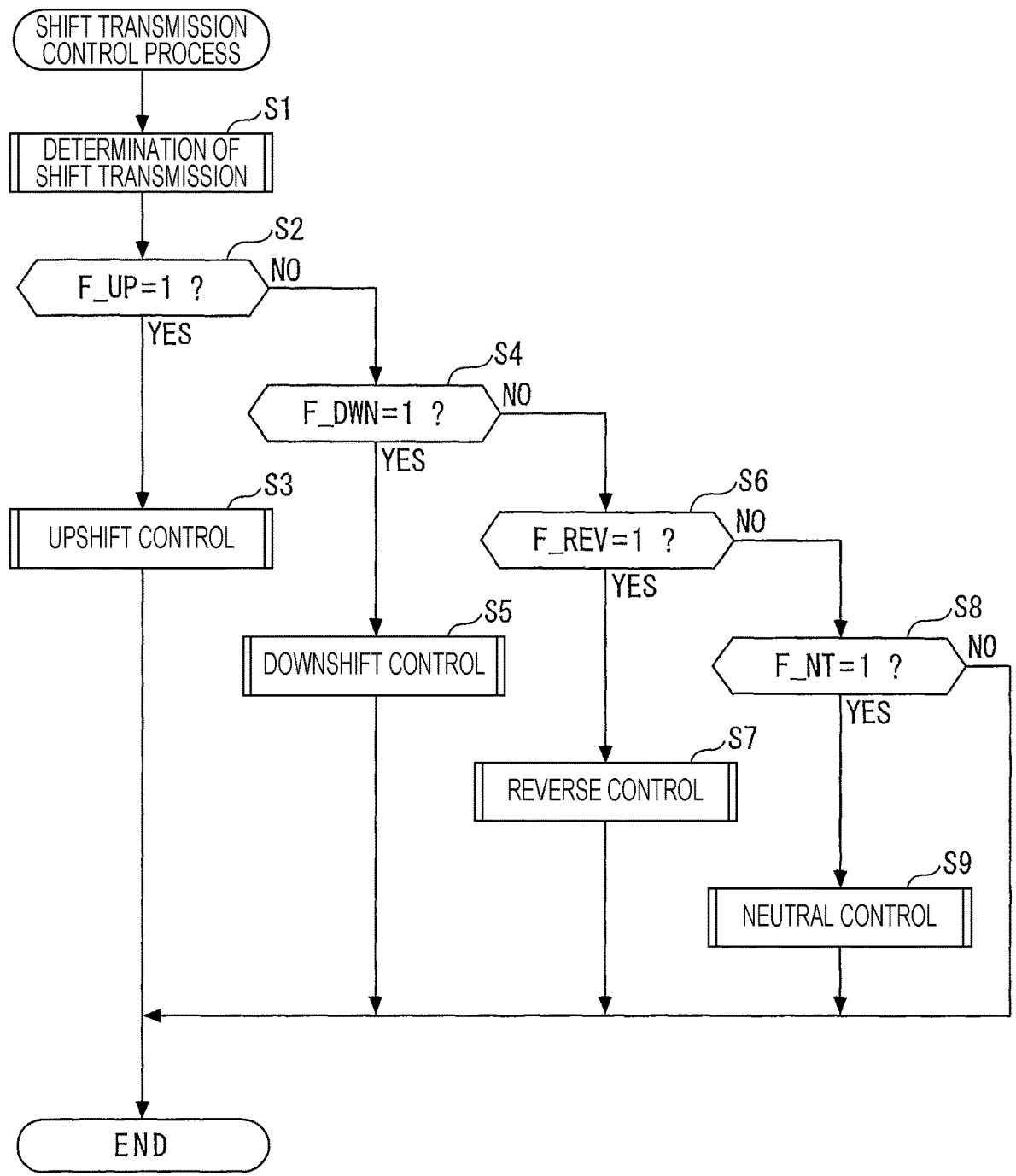
FIG. 2 is a flowchart illustrating a shift transmission control process.

FIG. 2 is a flowchart illustrating the shift transmission control process. The shift transmission control process controls the operations of, for example, the two CL actuators 4a and 4b and the multiple transmission actuators in a manner described below and is performed by the ECU 2 with a predetermined control period ΔT (for example, every 10 milliseconds). Various values calculated in the following description are stored in the RAM in the ECU 2.

In the shift transmission control process in FIG. 2, in Step 1 (abbreviated to "S1" in FIG. 2 and the same applies to the other flowcharts), the ECU 2 performs a shift transmission determination step. In the shift transmission determination step, values of an upshift flag F_UP, a downshift flag F_DWN, a reverse flag F_REV, a neutral flag F_NT, and a torque-down condition flag F_TRQ_DWN are set on the basis of the detection signals supplied from the shift position sensor 24 and the transmission gear sensor 25, the operation state parameters including the accelerator position AP and the engine rotation speed NE, and a running state parameter, such as the vehicle speed VP, described above.

The upshift flag F_UP is set to one ("1") if a condition to shift up the current transmission gear to a gear at the high speed side (hereinafter referred to as a "upshift condition") is established and is otherwise set to zero ("0"). The downshift flag F_DWN is set to one ("1") if a condition to shift down the current transmission gear to a gear at the low speed side is established and is otherwise set to zero ("0").

The reverse flag F_REV is set to one ("1") if a condition to change the current transmission gear to a reverse gear is established and is otherwise set to zero ("0"). The neutral flag F_NT is set to one ("1") if a condition to change the current transmission gear to the neutral state is established and is otherwise set to zero ("0").

The torque-down condition flag F_TRQ_DWN is set to one ("1") if a condition to perform torque-down control for reducing the torque generated in the engine 3 is established when the operation states of the first and second clutches during upshift transmission is in an inertia phase and is otherwise set to zero ("0").

After the shift transmission determination step in Step 1, in Step 2, the ECU 2 determines whether the upshift flag F_UP is set to one ("1"). If the determination in Step 2 is affirmative (YES in Step 2), in Step 3, the ECU 2 performs an upshift control step.

In the upshift control step, the transmission gear is shifted up to a gear at the high speed side by controlling the two CL actuators 4a and 4b and the multiple transmission actuators. After the upshift control step in Step 3, the process illustrated in FIG. 2 is terminated.

If the determination in Step 2 is negative (NO in Step 2), in Step 4, the ECU 2 determines whether the downshift flag F_DWN is set to one ("1"). If the determination in Step 4 is affirmative (YES in Step 4), in Step 5, the ECU 2 performs a downshift control step.

In the downshift control step, the transmission gear is shifted down to a gear at the low speed side by controlling the two CL actuators 4a and 4b and the multiple transmission actuators. After the downshift control step in Step 5, the process illustrated in FIG. 2 is terminated.

If the determination in Step 4 is negative (NO in Step 4), in Step 6, the ECU 2 determines whether the reverse flag F_REV is set to one ("1"). If the determination in Step 6 is affirmative (YES in Step 6), in Step 7, the ECU 2 performs a reverse control step.

In the reverse control step, the transmission gear is changed to the reverse gear by controlling the two CL actuators 4a and 4b and the multiple transmission actuators. After the reverse control step in Step 7, the process illustrated in FIG. 2 is terminated.

If the determination in Step 6 is negative (NO in Step 6), in Step 8, the ECU 2 determines whether the neutral flag F_NT is set to one ("1"). If the determination in Step 8 is affirmative (YES in Step 8), in Step 9, the ECU 2 performs a neutral control step.

In the neutral control step, the current transmission gear is changed to the neutral state by controlling the two CL actuators 4a and 4b and the multiple transmission actuators. After the neutral control step in Step 9, the process illustrated in FIG. 2 is terminated.

If the determination in Step 8 is negative (NO in Step 8), that is, if all of the four flags: the upshift flag F_UP, the downshift flag F_DWN, the reverse flag F_REV, and the neutral flag F_NT are set to zero ("0"), the ECU 2 determines that it is not necessary to perform the shift transmission and the process illustrated in FIG. 2 is terminated.

Figure 3:
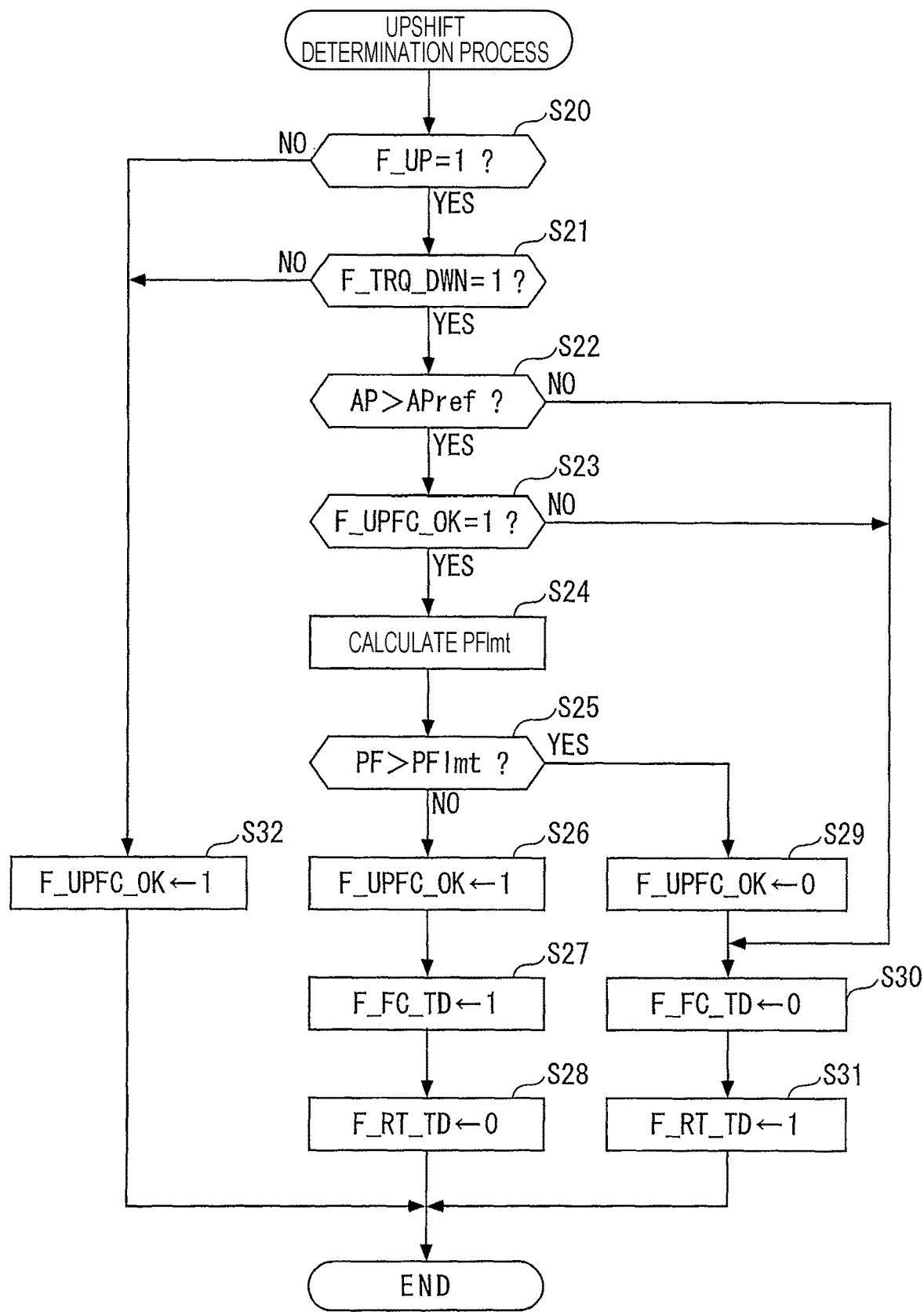
FIG. 3 is a flowchart illustrating an upshift determination process.

FIG. 3 is a flowchart illustrating an upshift determination process. The upshift determination process determines whether FC torque-down control or delay-angle torque-down control during the upshift transmission is to be performed. The upshift determination process is performed by the ECU 2 with the predetermined control period ΔT, mentioned above.

Referring to FIG. 3, in Step 20, the ECU 2 determines whether the upshift flag F_UP is set to one ("1"). If the determination in Step 20 is affirmative (YES in Step 20) and the upshift control is being performed, in Step 21, the ECU 2 determines whether the torque-down condition flag F_TRQ_DWN is set to one ("1").

If the determination in Step 21 is affirmative (YES in Step 21) and the condition to perform the torque-down control is established, in Step 22, the ECU 2 determines whether the accelerator position AP is greater than a predetermined determination value APref (AP>APref). The predetermined determination value APref is used to determine whether the accelerator pedal is being operated. If AP≤APref, the accelerator pedal is not being operated and the accelerator position AP is set to a value considered to indicate that AP≅0 is established.

If the determination in Step 22 is affirmative (YES in Step 22) and the accelerator pedal is being operated, in Step 23, the ECU 2 determines whether an FC torque-down condition flag F_UPFC_OK stored in the RAM is set to one ("1").

Figure 4:
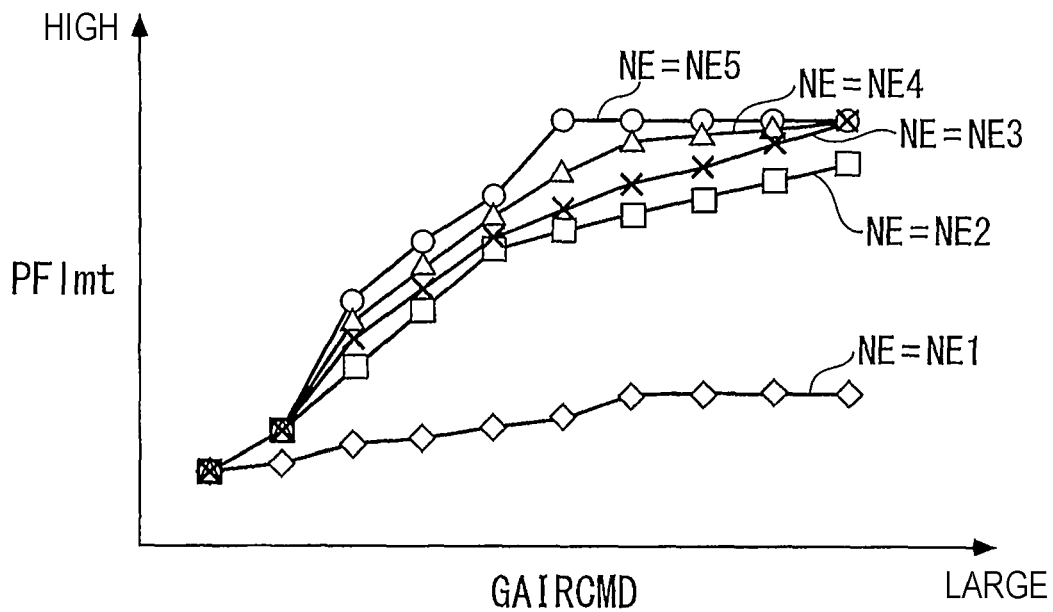
FIG. 4 illustrates an exemplary map used in calculation of an upper limit fuel pressure.

If the determination in Step 23 is affirmative (YES in Step 23) and F_UPFC_OK=1, in Step 24, the ECU 2 calculates upper limit fuel pressure PFlmt (a requested injection amount parameter, a target injection amount parameter) by searching a map illustrated in FIG. 4 on the basis of the engine rotation speed NE and a target air amount GAIRCMD.

The upper limit fuel pressure PFlmt corresponds to the upper limit value of the fuel pressure PF at which the fuel injection valve 3b is capable of injecting the fuel of a requested injection amount so that the amount of fuel injection does not exceed the amount of fuel injection corresponding to the target air amount GAIRCMD, that is, the requested injection amount requested for the engine 3 under the current operation condition of the engine 3. The target air amount GAIRCMD is calculated in an intake air control process described below. Referring to FIG. 4, NE1 to NE5 denote predetermined values of the engine rotation speed NE, which are set so as to establish NE1<NE2<NE3<NE4<NE5.

As illustrated in FIG. 4, the upper limit fuel pressure PFlmt is set to a higher value with the increasing engine rotation speed NE or with the increasing target air amount GAIRCMD. This is because the requested injection amount is increased with the increasing engine rotation speed NE or with the increasing target air amount GAIRCMD.

In Step 25, the ECU 2 determines whether the fuel pressure PF is higher than the upper limit fuel pressure PFlmt. If the determination in Step 25 is negative (NO in Step 25) and PF≤PFlmt is established, the ECU 2 determines that the condition to perform the FC torque-down control is established. In order to indicate that the condition to perform the FC torque-down control is established, in Step 26, the ECU 2 sets the FC torque-down condition flag F_UPFC_OK to one ("1").

In Step 27, the ECU 2 sets an FC torque-down permission flag F_FC_TD to one ("1") in order to indicate that the FC torque-down control should be performed.

In Step 28, the ECU 2 sets a delay-angle torque-down permission flag F_RT_TD to zero ("0") in order to indicate that the delay-angle torque-down control should be inhibited. Then, the process illustrated in FIG. 3 is terminated.

If the determination in Step 25 is affirmative (YES in Step 25) and PF>PFlmt is established, the ECU 2 determines that the condition to perform the FC torque-down control is not established. In order to indicate that the condition to perform the FC torque-down control is not established, in Step 29, the ECU 2 sets the FC torque-down condition flag F_UPFC_OK to zero ("0").

In Step 30, the ECU 2 sets the FC torque-down permission flag F_FC_TD to zero ("0") in order to indicate that the FC torque-down control should be inhibited.

In Step 31, the ECU 2 sets the delay-angle torque-down permission flag F_RT_TD to one ("1") in order to indicate that the delay-angle torque-down control should be performed. Then, the process illustrated in FIG. 3 is terminated.

If the determination in Step 22 or Step 23 is negative (NO in Step 22 or No in Step 23), that is, if AP≤APref (AP≅0) is established or PF>PFlmt has been established at the last or previous control timing during the upshift transmission, the process performs Step 30 and Step 31, as described above. Then, the process illustrated in FIG. 3 is terminated.

If the determination in Step 20 or Step 21 is negative (NO in Step 20 or No in Step 21), that is, if the upshift control is not being performed or the condition to perform the torque-down control is not established, in Step 32, the ECU 2 sets the FC torque-down condition flag F_UPFC_OK to one ("1"). Then, the process illustrated in FIG. 3 is terminated. This is because, also when both of the determination results in Step 20 and Step 21 are updated from NO to YES at the next or subsequent control timing, Step 24 and Step 25 described above are performed.

Figure 5:
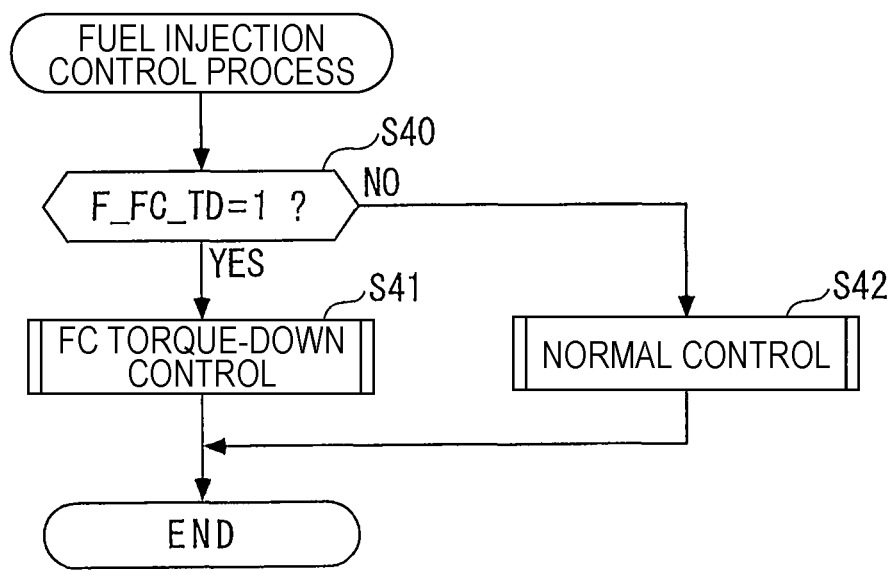
FIG. 5 is a flowchart illustrating a fuel injection control process.

FIG. 5 is a flowchart illustrating the fuel injection control process. The fuel injection control process controls the amount of fuel injection and the injection timing through the fuel injection valve 3b. The fuel injection control process is performed by the ECU 2 in synchronization with timing when the TDC signal described above is generated.

Referring to FIG. 5, in Step 40, the ECU 2 determines whether the FC torque-down permission flag F_FC_TD is set to one ("1"). If the determination in Step 40 is affirmative (YES in Step 40) and the FC torque-down control should be performed, in Step 41, the ECU 2 performs an FC torque-down control step.

In the FC torque-down control step, the output of the control input signal from the ECU 2 to the fuel injection valve 3b is stopped and the fuel injection through the fuel injection valve 3b is stopped. Accordingly, the torque generated in the engine 3 is reduced. After the FC torque-down control step in Step 41, the process illustrated in FIG. 5 is terminated.

If the determination in Step 40 is negative (NO in Step 40) and the FC torque-down control should be inhibited, in Step 42, the ECU 2 performs a normal control step.

In the normal control step, an amount of fuel injection TOUT is calculated on the basis of the operation state parameters including the engine rotation speed NE, the accelerator position AP, an amount of intake air (calculated from a detection signal supplied from an air flow sensor (not illustrated)), an air fuel ratio, and an engine water temperature and injection timing θINJ is calculated on the basis of the amount of fuel injection TOUT and the engine rotation speed NE.

Supply of the control input signals corresponding to the results of the calculation from the ECU 2 to the fuel injection valve 3b causes the fuel to be injected from the fuel injection valve 3b into the cylinders so as to achieve the amount of fuel injection TOUT and the injection timing θINJ. After the normal control step in Step 42, the process illustrated in FIG. 5 is terminated.

Figure 6:
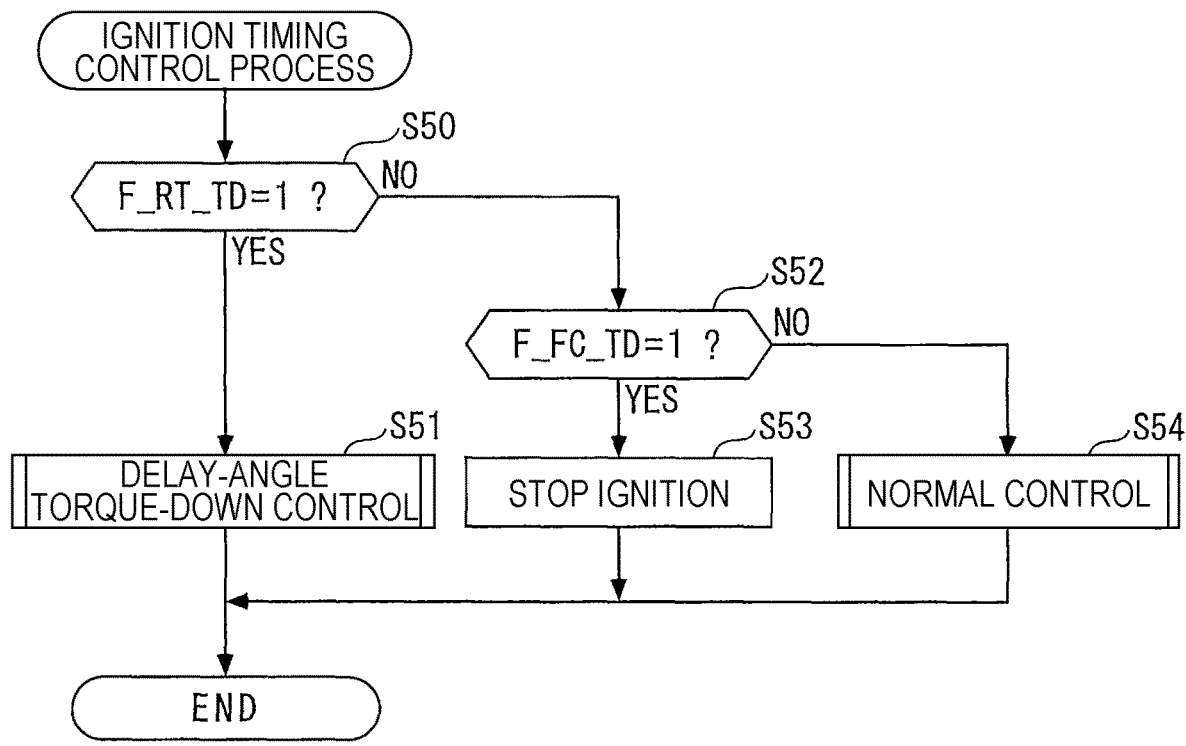
FIG. 6 is a flowchart illustrating an ignition timing control process.

FIG. 6 is a flowchart illustrating the ignition timing control process. The ignition timing control process controls timing when the air-fuel mixture is ignited with the ignition plug 3c, that is, ignition timing with the ignition plug 3c and is performed by the ECU 2 with the predetermined control period ΔT described above.

Referring to FIG. 6, in Step 50, the ECU 2 determines whether the delay-angle torque-down permission flag F_RT_TD is set to one ("1"). If the determination in Step 50 is affirmative (YES in Step 50) and the delay-angle torque-down control should be performed, in Step 51, the ECU 2 performs a delay-angle torque-down control step.

In the delay-angle torque-down control step, the ECU 2 moves the ignition timing with the ignition plug 3c to a delay angle side, compared with the state before the delay-angle torque-down control step is started. This reduces the torque generated by the engine 3. After the delay-angle torque-down control step in Step 51, the process illustrated in FIG. 6 is terminated.

If the determination in Step 50 is negative (NO in Step 50), in Step 52, the ECU 2 determines whether the FC torque-down permission flag F_FC_TD is set to one ("1"). If the determination in Step 52 is affirmative (YES in Step 52), the ECU 2 determines that the FC torque-down control is being performed. In Step 53, the ECU 2 stops the ignition with the ignition plug 3c. Then, the process illustrated in FIG. 6 is terminated.

If the determination in Step 52 is negative (NO in Step 52), in Step 54, the ECU 2 performs the normal control step.

In the normal control step, the ignition timing with the ignition plug 3c is calculated on the basis of various operation conditions including the engine water temperature, in addition to the amount of fuel injection and the injection timing described above, and the control input signal corresponding to the result of the calculation is supplied from the ECU 2 to the ignition plug 3c. As a result, the air-fuel mixture in the cylinders is ignited with the ignition plug 3c at the calculated ignition timing. After the normal control step in Step 54, the process illustrated in FIG. 6 is terminated.

Figure 7:
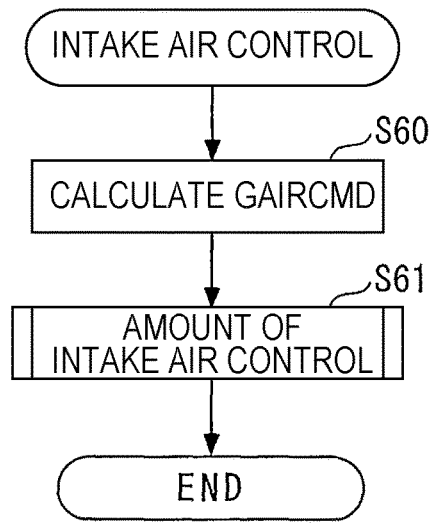
FIG. 7 is a flowchart illustrating an intake air control process.

FIG. 7 is a flowchart illustrating the intake air control process. The intake air control process controls the amount of intake air via, for example, a throttle valve mechanism (not illustrated) and is performed by the ECU 2 with the predetermined control period ΔT.

Referring to FIG. 7, in Step 60, the ECU 2 calculates the target air amount GAIRCMD described above by searching a map (not illustrated) on the basis of the engine rotation speed NE and the accelerator position AP.

In Step 61, the ECU 2 performs an amount-of-intake-air control step. Specifically, the ECU 2 controls the operation of, for example, the throttle valve mechanism on the basis of the target air amount GAIRCMD. This controls the amount of intake air so as to be equal to the target air amount GAIRCMD. After the amount-of-intake-air control step in Step 61, the process illustrated in FIG. 7 is terminated.

Figure 8:
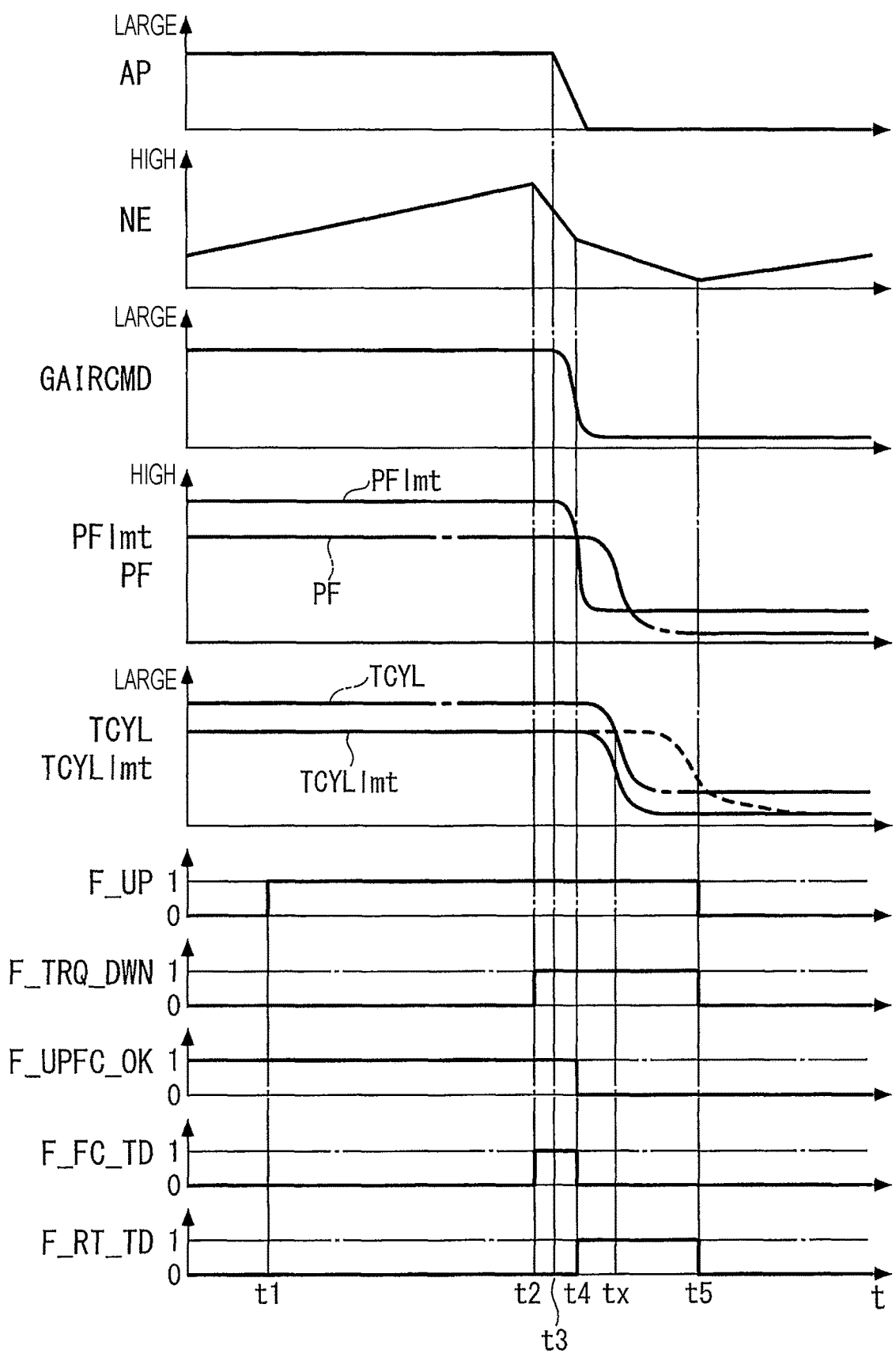
FIG. 8 is a timing chart illustrating an exemplary control result.

FIG. 8 is a timing chart illustrating an exemplary control result when the various control processes described above have been performed. Referring to FIG. 8, TCYL denotes a requested injection amount calculated on the basis of the actual amount of intake air and TCYLlmt denotes a minimum injectable amount calculated on the basis of the upper limit fuel pressure PFlmt. The minimum injectable amount TCYLlmt represented by a broken line indicates data when the FC torque-down control is continued also if PF>PFlmt is established.

As illustrated in FIG. 8, at a time t1, the upshift condition is established, the upshift flag F_UP is updated from zero ("0") to one ("1"), and the upshift control is started.

At a time t2 when the operation state of the first and second clutches is moved to the inertia phase and the condition to perform the torque-down control is established, the torque-down condition flag F_TRQ_DWN is updated from zero ("0") to one ("1") and the FC torque-down permission flag F_FC_TD is updated from zero ("0") to one ("1"). After the time t2, the engine rotation speed NE is decreased with the progress of the FC torque-down control.

Then, during the FC torque-down control, at a time t3 when the accelerator pedal is released, the target air amount GAIRCMD is decreased and the upper limit fuel pressure PFlmt is also decreased with the decrease in the accelerator position AP.

At a time t4 when PF>PFlmt is established and the determination in Step 25 is affirmative, the FC torque-down condition flag F_UPFC_OK and the FC torque-down permission flag F_FC_TD are reset from one ("1") to zero ("0") and the delay-angle torque-down permission flag F_RT_TD is updated from zero ("0") to one ("1"). After the time t4, the delay-angle torque-down control is performed.

At a time t5 when the upshift control is terminated, the three flags: the upshift flag F_UP, the torque-down condition flag F_TRQ_DWN, and the delay-angle torque-down permission flag F_RT_TD are reset from one ("1") to zero ("0").

Through the above control, as illustrated in FIG. 8, the minimum injectable amount TCYLlmt is constantly kept at a value smaller than the requested injection amount TCYL during the upshift transmission. When the fuel injection is restarted after the upshift transmission is terminated, the fuel of the requested injection amount TCYL that does not exceed the requested injection amount TCYL is appropriately injected.

In contrast, the data about the minimum injectable amount TCYLlmt represented by the broken line in FIG. 8 demonstrates that, when the FC torque-down control is continued even if PF>PFlmt is established, the minimum injectable amount TCYLlmt exceeds the requested injection amount TCYL during a time period from a time tx to the time t5. As a result, when the fuel injection is restarted after the upshift transmission is terminated at the time t5, excessive fuel is injected from the fuel injection valve 3b, as in the case in Japanese Unexamined Patent Application Publication No. 2014-58907, the entire contents of which are incorporated herein by reference. This may cause, for example, degradation of fuel efficiency performance and emission characteristics due to accident fire from the engine 3 or reduction in control accuracy of the air fuel ratio. In other words, with the control method of the present embodiment, it is possible to avoid occurrence of such issues.

As described above, with the control apparatus 1 of the present embodiment, the FC torque-down control is performed if the fuel pressure PF is lower than or equal to the upper limit fuel pressure PFlmt when the condition to perform the torque-down control is established during the upshift transmission, and the FC torque-down control is stopped and the delay-angle torque-down control is subsequently performed if the fuel pressure PF exceeds the upper limit fuel pressure PFlmt. In this case, the upper limit fuel pressure PFlmt is calculated as the upper limit value of the fuel pressure PF at which the fuel injection valve 3b is capable of injecting the fuel of the requested injection amount so that the amount of fuel injection does not exceed the amount of fuel injection corresponding to the target air amount GAIRCMD, that is, the requested injection amount requested for the engine 3 under the current operation condition of the engine 3. Accordingly, when the fuel injection is restarted after the upshift transmission is terminated, unlike the case in Japanese Unexamined Patent Application Publication No. 2014-58907 in which excessive fuel is injected from the fuel injection valve, the entire contents of which are incorporated herein by reference, the fuel of the requested injection amount corresponding to the target air amount GAIRCMD is appropriately injected from the fuel injection valve 3b also after the upshift transmission is terminated. Accordingly, an excellent operation state of the engine 3 is kept and all of the control accuracy of the fuel injection, the fuel efficiency performance, and the emission characteristics are kept at high levels.

The upper limit fuel pressure PFlmt is calculated on the basis of the engine rotation speed NE and the target air amount GAIRCMD. In this case, since the engine rotation speed NE and the target air amount GAIRCMD are highly correlated with the requested injection amount, the upper limit fuel pressure PFlmt is accurately calculated as the upper limit value of the fuel pressure PF at which the fuel of the requested injection amount is capable of being injected. In addition, the use of the target air amount GAIRCMD, instead of the actual amount of intake air, allows the FC torque-down control to be stopped before the amount of intake air is actually reduced. Furthermore, since the fuel pressure PF is the actual pressure of the fuel in the fuel injection valve 3b, the fuel pressure PF accurately represents the minimum injectable amount which is actually injectable from the fuel injection valve 3b. Accordingly, comparison of the fuel pressure PF with the upper limit fuel pressure PFlmt allows the determination of whether the FC torque-down control is to be stopped to be accurately and quickly performed.

If the AP≤APref, that is, AP≅0 is established during the FC torque-down control, the FC torque-down control is stopped and the delay-angle torque-down control and the fuel injection control are started, regardless of the relationship in magnitude between the fuel pressure PF and the upper limit fuel pressure PFlmt. Accordingly, when a driver stops to operate the accelerator pedal and the minimum injectable amount is estimated to surely exceed the requested injection amount, the determination of whether the FC torque-down control is to be stopped is more quickly performed.

Since the delay-angle torque-down control, that is, the delay angle control of the ignition timing has high responsiveness, the torque-down control of the engine 3 is quickly performed after the FC torque-down control is stopped to ensure high controllability.

Although the automatic transmission 4 of a dual clutch transmission (DCT) type is used as the automatic transmission in the present embodiment, the automatic transmission is not limited to this and may be any automatic transmission as long as the automatic transmission is capable of performing the transmission operation of the internal combustion engine. For example, an automatic MT of a single clutch type, a stepped automatic transmission with a torque converter, or a continuously variable transmission (CVT) with a stepped mode may be used as the automatic transmission.

Although the engine rotation speed NE and the target air amount GAIRCMD are used as the operation state parameters in the present embodiment, the operation state parameters are not limited to those and may be any parameter as long as the parameter represents the operation state of the internal combustion engine. For example, the amount of intake air, the accelerator position AP, and the degree of opening of the throttle valve may be used as the operation state parameters.

Although the upper limit fuel pressure PFlmt is used as the requested injection amount parameter in the present embodiment, the requested injection amount parameter is not limited to this and may be any parameter corresponding to the amount of fuel injection required in the internal combustion engine. For example, the requested injection amount TCYL itself may be used as the requested injection amount parameter.

Although the fuel pressure PF is used as the minimum injectable amount parameter in the present embodiment, the minimum injectable amount parameter is not limited to this and may be the minimum value of the amount of fuel injection capable of actually being injected from the fuel injection unit. For example, the minimum injectable amount TCYLlmt may be used as the minimum injectable amount parameter.

Although the upper limit fuel pressure PFlmt is calculated on the basis of the engine rotation speed NE and the target air amount GAIRCMD by searching the map in the present embodiment, the upper limit fuel pressure PFlmt may be calculated on the basis of only the target air amount GAIRCMD using a map in which the relationship between the upper limit fuel pressure PFlmt and the target air amount GAIRCMD is defined. Alternatively, the upper limit fuel pressure PFlmt may be calculated on the basis of the actual amount of intake air detected with the air flow sensor, instead of the target air amount GAIRCMD. In this case, since the actual amount of intake air exposes response delay characteristics for the target air amount GAIRCMD, the method of the present embodiment is effective in terms of the responsiveness.

Although the fuel injection valve 3b is used as the fuel injection unit in the present embodiment, the fuel injection unit is not limited to this and may be any fuel injection unit capable of fuel injection.

Although the control apparatus is applied to the internal combustion engine for a vehicle in the present embodiment, the control apparatus is not limited to this and is also applicable to an internal combustion engine for a ship or an internal combustion engine for another industrial machine.

The present application describes a control apparatus 1 for an internal combustion engine 3, in which fuel is injected with a fuel injection unit (a fuel injection valve 3b) and a shift transmission operation is performed with an automatic transmission 4. The control apparatus includes a fuel-cut torque-down control unit (the ECU 2 and Steps 40 and 41) that performs fuel-cut torque-down control to stop the fuel injection with the fuel injection unit (the fuel injection valve 3b) so that torque generated by the internal combustion engine 3 is reduced during upshift transmission with the automatic transmission 4; a requested injection amount parameter acquiring unit (the ECU 2 and Step 24) that acquires a requested injection amount parameter (upper limit fuel pressure PFlmt) representing a requested injection amount, which is an amount of fuel injection from the fuel injection unit (the fuel injection valve 3b) required in the internal combustion engine 3, on the basis of an operation state parameter (an engine rotation speed NE and an accelerator position AP) representing an operation state of the internal combustion engine 3; a minimum injectable amount parameter acquiring unit (the ECU 2 and a fuel pressure sensor 21) that acquires a minimum injectable amount parameter (fuel pressure PF) representing a minimum injectable amount, which is a minimum value of the amount of fuel injection actually injectable from the fuel injection unit (the fuel injection valve 3b); and a fuel injection control unit (the ECU 2 and Steps 25, 30, 40, and 42) that stops the fuel-cut torque-down control and performs the fuel injection with the fuel injection unit (the fuel injection valve 3b) if the minimum injectable amount represented by the minimum injectable amount parameter exceeds the requested injection amount represented by the requested injection amount parameter while the FC torque-down control is being performed during the upshift transmission.

With the control apparatus for an internal combustion engine, the FC torque-down control to stop the fuel injection with the fuel injection unit is performed so that the torque generated by the internal combustion engine is reduced during the upshift transmission with the automatic transmission to acquire the requested injection amount parameter representing the requested injection amount, which is the amount of fuel injection from the fuel injection unit necessary in the internal combustion engine, on the basis of the operation state parameter representing the operation state of the internal combustion engine, and to acquire the minimum injectable amount parameter representing the minimum injectable amount, which is the minimum value of the amount of fuel injection actually injectable from the fuel injection unit. If the minimum injectable amount represented by the minimum injectable amount parameter exceeds the requested injection amount represented by the requested injection amount parameter while the FC torque-down control is being performed during the upshift transmission, the FC torque-down control is stopped and the fuel injection with the fuel injection unit is performed. Accordingly, when the fuel injection is restarted after the upshift transmission is terminated, unlike the case in Japanese Unexamined Patent Application Publication No. 2014-58907 in which excessive fuel is injected from the fuel injection valve, the entire contents of which are incorporated herein by reference, an excellent operation state of the internal combustion engine is kept and all of the control accuracy of the fuel injection, the fuel efficiency performance, and the emission characteristics are kept at high levels also after the upshift transmission is terminated (the "acquisition" in the "acquisition of the requested injection amount parameter" and the "acquisition of the minimum injectable amount parameter" includes calculation of these values on the basis of other parameters, in addition to direct detection of these values with, for example, a sensor).

The control apparatus for an internal combustion engine may further include a target air amount calculating unit (the ECU 2 and Step 60) that calculates a target air amount GAIRCMD, which is a target amount of intake air of the internal combustion engine 3, as the operation state parameter. The requested injection amount parameter acquiring unit may acquire the upper limit fuel pressure PFlmt, which is an upper limit of fuel pressure at which the fuel injection unit (the fuel injection valve 3b) is capable of injecting the fuel of the requested injection amount so that the amount of fuel injection does not exceed the requested injection amount, as the requested injection amount parameter on the basis of the target air amount GAIRCMD. The minimum injectable amount parameter acquiring unit may acquire fuel pressure PF, which is actual pressure of the fuel in the fuel injection unit (the fuel injection valve 3b), as the minimum injectable amount parameter. The fuel injection control unit may stop the FC torque-down control and may perform the fuel injection with the fuel injection (the fuel injection valve 3b) (Steps 25, 30, 40, and 42) if the fuel pressure PF exceeds the upper limit fuel pressure PFlmt during the FC torque-down control.

With the control apparatus for an internal combustion engine, the upper limit fuel pressure, which is the upper limit of the fuel pressure at which the fuel injection unit is capable of injecting the fuel of the requested injection amount so that the amount of fuel injection does not exceed the requested injection amount, is acquired as the requested injection amount parameter on the basis of the target air amount, the fuel pressure, which is the actual pressure of the fuel in the fuel injection unit, is acquired as the minimum injectable amount parameter, and the FC torque-down control is stopped and the fuel injection with the fuel injection unit is performed if the fuel pressure exceeds the upper limit fuel pressure during the FC torque-down control. In this case, since the amount of intake air is highly correlated with the requested injection amount and the target air amount is used, instead of the actual amount of intake air, the FC torque-down control is stopped before the amount of intake air is actually reduced. Furthermore, since the fuel pressure is the actual pressure of the fuel in the fuel injection unit, the fuel pressure accurately represents the minimum injectable amount which is actually injectable from the fuel injection unit. Accordingly, comparison of the fuel pressure with the upper limit fuel pressure allows the determination of whether the FC torque-down control is to be stopped to be accurately and quickly performed.

The control apparatus for an internal combustion engine may further include an engine rotation speed acquiring unit (the ECU 2 and a crank angle sensor 20) that acquires the engine rotation speed NE, which is the rotation speed of the internal combustion engine 3, as the operation state parameter. The requested injection amount parameter acquiring unit may acquire the upper limit fuel pressure PFlmt on the basis of the engine rotation speed NE, in addition to the target air amount GAIRCMD.

With the control apparatus for an internal combustion engine, the upper limit fuel pressure is acquired on the basis of the engine rotation speed, in addition to the target air amount. In this case, since the engine rotation speed is highly correlated with the requested injection amount, the use of the upper limit fuel pressure calculated on the basis of the engine rotation speed, in addition to the target air amount, allows the accuracy of the determination of whether the FC torque-down control is to be stopped to be further improved.

In the control apparatus for an internal combustion engine, the internal combustion engine 3 may be mounted in a vehicle V, which is a power source. The control apparatus may further include an amount-of-accelerator-operation acquiring unit (the ECU 2 and an accelerator position sensor 22) that acquires an amount of operation of an accelerator pedal of the vehicle V. The fuel injection control unit may stop the FC torque-down control and may perform the fuel injection with the fuel injection unit (the fuel injection valve 3b) (Steps 22, 30, 40, and 42) if the amount of operation of the accelerator pedal is smaller than a predetermined determination value during the FC torque-down control regardless of relationship in magnitude between the fuel pressure PF and the upper limit fuel pressure PFlmt.

With the control apparatus for an internal combustion engine, the FC torque-down control is stopped and the fuel injection with the fuel injection unit is performed if the amount of operation of the accelerator pedal is smaller than a predetermined determination value during the FC torque-down control regardless of the relationship in magnitude between the fuel pressure and the upper limit fuel pressure. Accordingly, when a driver stops to operate the accelerator pedal and the minimum injectable amount is estimated to surely exceed the requested injection amount, appropriately setting the predetermined determination value allows the determination of whether the FC torque-down control is to be stopped to be more quickly performed.

The control apparatus for an internal combustion engine 3 may further include a delay-angle torque-down control unit (the ECU 2 and Steps 50 and 51) that performs delay-angle torque-down control to move the ignition timing of the internal combustion engine 3 to a delay angle side, compared with the state before the FC torque-down control is stopped, when the FC torque-down control is stopped.

With the control apparatus for an internal combustion engine, the delay-angle torque-down control to move the ignition timing of the internal combustion engine to a delay angle side, compared with the state before the FC torque-down control is stopped, is performed when the FC torque-down control is stopped. In this case, since the delay angle control of the ignition timing has high responsiveness, the torque-down control of the internal combustion engine is quickly performed after the FC torque-down control is stopped to ensure high controllability.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an internal combustion engine, in which fuel is injected with a fuel injection unit and a shift transmission operation is performed with an automatic transmission, the control apparatus comprising:
an engine control unit configured to:
perform fuel-cut torque-down control to stop the fuel injection with the fuel injection unit so that torque generated by the internal combustion engine is reduced during upshift transmission with the automatic transmission;
acquire a requested injection amount parameter representing a requested injection amount, which is an amount of fuel injection from the fuel injection unit required in the internal combustion engine, on the basis of an operation state parameter representing an operation state of the internal combustion engine;

acquire a minimum injectable amount parameter representing a minimum injectable amount, which is a minimum value of the amount of fuel injection actually injectable from the fuel injection unit; and stop the fuel-cut torque-down control and perform the fuel injection with the fuel injection unit if the minimum injectable amount represented by the minimum injectable amount parameter exceeds the requested injection amount represented by the requested injection amount parameter while the fuel-cut torque-down control is being performed during the upshift transmission.

2. The control apparatus for an internal combustion engine according to claim 1, wherein the engine control unit is further configured to calculate a target air amount, which is a target amount of intake air of the internal combustion engine, as the operation state parameter, wherein the engine control unit acquires upper limit fuel pressure, which is an upper limit of fuel pressure at which the fuel injection unit is capable of injecting the fuel of the requested injection amount so that the amount of fuel injection does not exceed the requested injection amount, as the requested injection amount parameter on the basis of the target air amount, wherein the engine control unit acquires fuel pressure, which is actual pressure of the fuel in the fuel injection unit, as the minimum injectable amount parameter, and wherein the engine control unit stops the fuel-cut torque-down control and performs the fuel injection with the fuel injection if the fuel pressure exceeds the upper limit fuel pressure during the fuel-cut torque-down control.

3. The control apparatus for an internal combustion engine according to claim 2, wherein the engine control unit is further configured to acquire an engine rotation speed, which is a rotation speed of the internal combustion engine, wherein the engine control unit acquires the upper limit fuel pressure on the basis of the engine rotation speed, in addition to the target air amount.

4. The control apparatus for an internal combustion engine according to claim 2, wherein the internal combustion engine is mounted in a vehicle, which is a power source, wherein the engine control unit is further configured to acquire an amount of operation of an accelerator pedal of the vehicle, wherein the engine control unit stops the fuel-cut torque-down control and performs the fuel injection with the fuel injection unit if the amount of operation of the accelerator pedal is smaller than a predetermined determination value during the fuel-cut torque-down control regardless of relationship in magnitude between the fuel pressure and the upper limit fuel pressure.

5. The control apparatus for an internal combustion engine according to claim 1, wherein the engine control unit is further configured to perform delay-angle torque-down control to move ignition timing of the internal combustion engine to a delay angle side, compared with the state before the fuel-cut torque-down control is stopped, when the fuel-cut torque-down control is stopped.

6. A control apparatus for an internal combustion engine, comprising:

circuitry configured to control a fuel injector of the internal combustion engine to stop injecting fuel into the internal combustion engine to reduce torque generated by the internal combustion engine during upshift of an automatic transmission connected to the internal combustion engine, acquire a target injection amount parameter corresponding to a target injection amount of the fuel to be injected by the fuel injector to operate the internal combustion engine based on an operation state parameter corresponding to an operation state of the internal combustion engine, acquire a minimum injectable amount parameter corresponding to a minimum injectable amount of the fuel injectable from the fuel injector, and control the fuel injector to start injecting the fuel when the minimum injectable amount parameter exceeds the target injection amount parameter while the fuel injector is controlled to stop injecting the fuel during the upshift.

7. The control apparatus according to claim 6, wherein the circuitry is configured to calculate a target air amount, which is a target amount of intake air of the internal combustion engine, as the operation state parameter, wherein the circuitry is configured to acquire upper limit fuel pressure, which is an upper limit of fuel pressure at which the target injection amount of the fuel is injectable from the fuel injector so that the amount of fuel injection does not exceed the target injection amount, as the target injection amount parameter based on the target air amount, wherein the circuitry is configured to acquire fuel pressure, which is actual pressure of the fuel in the fuel injector, as the minimum injectable amount parameter, and wherein the circuitry is configured to control the fuel injector to start injecting the fuel if the fuel pressure exceeds the upper limit fuel pressure while the fuel injector is controlled to stop injecting the fuel.

8. The control apparatus according to claim 7, wherein the circuitry is configured to acquire an engine rotation speed, which is a rotation speed of the internal combustion engine, wherein the circuitry is configured to acquire the upper limit fuel pressure based on the engine rotation speed in addition to the target air amount.

9. The control apparatus according to claim 7, wherein the internal combustion engine is mounted in a vehicle, which is a power source, wherein the circuitry is configured to acquire an amount of operation of an accelerator pedal of the vehicle, wherein the circuitry is configured to control the fuel injector to start injecting the fuel if the amount of operation of the accelerator pedal is smaller than a threshold value while the fuel injector is controlled to stop injecting the fuel regardless of relationship in magnitude between the fuel pressure and the upper limit fuel pressure.

10. The control apparatus according to claim 6, wherein the circuitry is configured to perform delay-angle torque-down control to move ignition timing of the internal combustion engine to a delay angle side, compared with the state before the fuel injector is controlled to stop injecting the fuel, when the fuel injector is controlled to stop injecting the fuel.

11. A control method for an internal combustion engine, comprising:
controlling a fuel injector of the internal combustion engine to stop injecting fuel into the internal combustion engine to reduce torque generated by the internal combustion engine during upshift of an automatic transmission connected to the internal combustion engine;
acquiring a target injection amount parameter corresponding to a target injection amount of the fuel to be injected by the fuel injector to operate the internal combustion engine based on an operation state parameter corresponding to an operation state of the internal combustion engine;
acquiring a minimum injectable amount parameter corresponding to a minimum injectable amount of the fuel injectable from the fuel injector; and
controlling the fuel injector to start injecting the fuel when the minimum injectable amount parameter exceeds the target injection amount parameter while the fuel injector is controlled to stop injecting the fuel during the upshift.

12. The control apparatus according to claim 1,
wherein the requested injection amount parameter corresponds to upper limit fuel pressure, and
wherein the upper limit fuel pressure increases as a rotation speed of the internal combustion engine increases.

13. The control apparatus according to claim 1, further comprising:
a fuel pressure sensor configured to detect actual pressure of fuel in the fuel injection unit,
wherein the minimum injectable amount parameter corresponds to the actual pressure.

14. The control apparatus according to claim 6,
wherein the target injection amount parameter corresponds to upper limit fuel pressure, and
wherein the upper limit fuel pressure increases as a rotation speed of the internal combustion engine increases.

15. The control apparatus according to claim 6, further comprising:
a fuel pressure sensor configured to detect actual pressure of fuel in the fuel injector,
wherein the minimum injectable amount parameter corresponds to the actual pressure.

16. The control method according to claim 11,
wherein the target injection amount parameter corresponds to upper limit fuel pressure, and
wherein the upper limit fuel pressure increases as a rotation speed of the internal combustion engine increases.

17. The control method according to claim 11, further comprising:
detecting actual pressure of fuel in the fuel injector,
wherein the minimum injectable amount parameter corresponds to the actual pressure.

18. The control apparatus according to claim 1, further comprising:
a fuel pressure sensor configured to detect actual pressure of fuel in the fuel injection unit,
wherein the minimum injectable amount parameter is the actual pressure of the fuel in the fuel injection unit detected by the fuel pressure sensor, the minimum injectable amount being the minimum value of the amount of fuel injection actually injectable from the fuel injection unit based on the actual pressure of the fuel in the fuel injection unit detected by the fuel pressure sensor.

19. The control apparatus according to claim 6, further comprising:
a fuel pressure sensor configured to detect actual pressure of fuel in a fuel injection unit of the internal combustion engine,
wherein the minimum injectable amount parameter is the actual pressure of the fuel in the fuel injection unit detected by the fuel pressure sensor, the minimum injectable amount being a minimum value of the amount of fuel injection actually injectable from the fuel injection unit based on the actual pressure of the fuel in the fuel injection unit detected by the fuel pressure sensor.

20. The control method according to claim 11, further comprising:
detecting actual pressure of fuel in a fuel injector of the internal combustion engine,
wherein the minimum injectable amount parameter is the actual pressure of the fuel in the fuel injection unit detected by the fuel pressure sensor, the minimum injectable amount being a minimum value of the amount of fuel injection actually injectable from the fuel injection unit based on the actual pressure of the fuel in the fuel injection unit detected by the fuel pressure sensor.

* * * * *